(12) United States Patent
Yang (10) Patent No.: US 10,205,693 B2
(45) Date of Patent: Feb. 12, 2019

(54) MESSAGE SENDING METHOD AND DEVICE AND MESSAGE RECEIVING METHOD AND DEVICE

(71) Applicant: YULONG COMPUTER TELECOMMUNICATION SCIENTIFIC (SHENZHEN) CO., LTD., Shenzhen (CN)

(72) Inventor: Fan Yang, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 298 days.

(21) Appl. No.: 15/277,966

(22) Filed: Sep. 27, 2016

(65) Prior Publication Data

US 2017/0019359 A1    Jan. 19, 2017

Related U.S. Application Data

(63) Continuation-in-part of application No. PCT/CN2014/074230, filed on Mar. 27, 2014.

(51) Int. Cl.
G06F 15/16 (2006.01)
H04L 12/58 (2006.01)
H04L 29/06 (2006.01)

(52) U.S. Cl.
CPC ........... *H04L 51/063* (2013.01); *H04L 51/08* (2013.01); *H04L 51/12* (2013.01); *H04L 51/16* (2013.01); *H04L 51/38* (2013.01); *H04L 63/0428* (2013.01); *H04L 63/105* (2013.01); *H04L 51/18* (2013.01)

(58) Field of Classification Search
CPC .... H04L 51/00; H04L 51/06; H04L 29/08072
USPC .................. 709/206, 220, 224, 228
See application file for complete search history.

(56) References Cited

U.S. PATENT DOCUMENTS

| | | | | |
|---|---|---|---|---|
| 8,849,909 | B2 * | 9/2014 | Farmer | G06Q 10/06 |
| | | | | 709/204 |
| 9,148,302 | B2 * | 9/2015 | Tysowski | G06Q 10/10 |
| 9,191,349 | B2 * | 11/2015 | Lindner | H04L 51/06 |
| 9,432,313 | B2 * | 8/2016 | Tomkow | H04L 51/30 |
| 9,596,194 | B2 * | 3/2017 | Tomkow | H04L 51/30 |
| 9,935,907 | B2 * | 4/2018 | Beausoleil | H04L 51/22 |
| 2010/0042690 | A1 | 2/2010 | Wall | |
| 2011/0213845 | A1 | 9/2011 | Logan et al. | |

(Continued)

*Primary Examiner* — Khanh Q Dinh
(74) *Attorney, Agent, or Firm* — ScienBiziP, P.C.

(57) ABSTRACT

Message sending and receiving methods, message sending and receiving devices are provided. The message sending method includes: dividing a short message into at least one attachment according to a division rule, and selecting a sending mode for each attachment according to a selection command; inserting a burn after reading tag to one or more attachments, the sending mode of which is detected as the burn after reading sending mode; sending the short message, one or more attachment in which having the burn after reading tag, to a message receiving device when receiving a sending command, for the one or more attachment being deleted according to the burn after reading tag after the short message is opened. The present disclosure selects a sending mode of each attachment in a short message, thus, one or more attachments are deleted after the short message is opened. Privacy of the short message is improved.

16 Claims, 7 Drawing Sheets

(56) References Cited

U.S. PATENT DOCUMENTS

| | | | | |
|---|---|---|---|---|
| 2011/0307560 A1* | 12/2011 | Tysowski | ............... | G06Q 10/10 |
| | | | | 709/206 |
| 2013/0117387 A1* | 5/2013 | Tomkow | .............. | G06Q 10/107 |
| | | | | 709/206 |
| 2015/0180845 A1* | 6/2015 | Uomini | ................. | H04L 63/083 |
| | | | | 726/3 |
| 2015/0207760 A1* | 7/2015 | Raleigh | ............... | H04L 41/0893 |
| | | | | 709/225 |

* cited by examiner

MESSAGE SENDING METHOD AND DEVICE AND MESSAGE RECEIVING METHOD AND DEVICE

This application is a continuation-in-part of International Application No. PCT/CN2014/074230, filed on Mar. 27, 2014.

FIELD

The embodiments of the present disclosure relate to client terminal technology, and specifically to a message sending method, a message receiving method, a message sending device, and a message receiving device.

BACKGROUND

With the popularity of mobile phones, security requirements and privacy requirements to the mobile phones are increasing gradually. Short messages are an important communication means, and privacy requirement of the short message have attracted more and more attentions from users.

Currently, short messages received by terminals (such as mobile phones) are saved automatically into the mobile phones. To keep short messages private, users need to click a "menu", and select a "delete" option to delete the short message. For some mobile phones, the short messages may then be moved to a trash can after a first deletion. Thus, to clear the short messages thoroughly, the user needs to go to the trash can to delete the firstly-deleted short messages again. Such operations are troublesome for users. Furthermore, for a received short message, if the received short message is saved, all contents included in the received short message are saved, and if the received short message is deleted, all contents included in the short message are deleted. A user cannot choose to delete parts of the contents included in the received short message. Thus, it is inconvenient for the users.

Therefore, how to delete only parts of the content included in short messages according to choices of the users is problematic.

SUMMARY OF THE INVENTION

To solve the above problem, the present disclosure provides a new way of sending messages which enables the selection of a sending mode of attachments included in a short message flexibly. Upon condition that the short message is sent by a burn after reading sending mode, and when an exit or a close command to the short message is received, one or more attachments of burn after reading included in the short message are deleted directly, thus, privacy of the short message is improved.

Therefore, according to one aspect of the present disclosure, a message sending method is provided. The method is executed in a message sending device and includes: dividing contents included in a short message into at least one attachment according to a predetermined division rule, and selecting a sending mode for each of the at least one attachment according to a selection command, where the sending mode includes a burn after reading sending mode or an ordinary sending mode; inserting a burn after reading tag into one or more of the at least one attachment when the sending mode of the one or more of the at least one attachment is detected to be the burn after reading sending mode; sending the short message, one or more of the at least one attachment include in which having the burn after reading tag, to a message receiving device, when a sending command is received, for the message receiving device deleting the one or more of the at least one attachment according to the burn after reading tag after the short message has been opened.

In the present embodiment, the short message is divided into at least one attachment, and a sending mode of each of the at least one attachment can be selected according to a selection command, thus flexibility and interest in message sending mode can be improved. Moreover, when a sending mode of one or more of the at least one attachment in the short message is the burn after reading sending mode, a burn after reading tag is inserted into the one or more of the at least one attachment, and the short message is sent by the burn after reading sending mode. After the short message is received, and when an exit or a close command to the short message is received, one or more of the at least one attachment having the burn after reading tag in the short message is deleted directly. In prior art, all contents included in the short message are deleted when a deletion operation is executed on the short message. Compared with the prior art, the present embodiment realizes customization of burn after reading to contents included in the short message. Privacy contents in the short message cannot be saved. The short message is protected against being leaked out, thus, privacy of the short message is improved.

The burn after reading can be indicated by a marker. For example, before a sending mode for each of the at least one attachment in the short message is selected, an initial marker for each of the at least one attachment can be set as "0". A default status can be that each of the at least one attachment is sent in an ordinary sending mode. After the burn after reading sending mode is selected for one or more of the at least one attachment, the marker of the one or more of the at least one attachment is changed to "1." The one or more of the at least one attachment with the marker "1" will be deleted directly after short message has been opened. One skilled in the art knows that the marker for burn after reading can be any other form, the embodiments mentioned above are not to be taken as limiting.

In the above embodiment, preferably, the predetermined division rule includes: identifying types of the contents included in the short message, and dividing the contents in the short message into at least one attachment according to the types.

In the present embodiment, by dividing the contents in the short message into the at least one attachment according to the types of the contents, it is convenient to select the one or more of the at least one attachment which needs to be sent using the burn after reading sending mode. The contents in the short message can include one or more or a combination of the following: character texts, pictures, audios, and videos. Specifically, the contents in the short message can be divided into at least one attachment according to the types of the contents. That is, each of the character texts, pictures, audios, and videos can be taken as an attachment. In another embodiment, the short message can be divided according to a predetermined character length. For example, for character texts, one character can be taken as an attachment, or more than one character can be taken as an attachment. The character length can be set by a user.

In the above embodiments, preferably, the method further include: sending the short message in the ordinary sending mode, when it is detected that the sending mode of each of the at least one attachment in the short message is the ordinary sending mode.

In the present embodiment, when the sending mode of each of the at least one attachment in the short message is the ordinary sending mode, it represents that the short message can be sent in the ordinary sending mode and not the burn after reading mode.

In the above embodiments, preferably, the method further include: displaying the at least one attachment of the short message and displaying the sending modes, for the user to select a sending mode for each of the at least one attachment.

The present embodiment displays the at least one attachment of the short message and the sending modes in a display interface, thus, it is convenient for the user to select a sending mode for each of the at least one attachment. Furthermore, the sending mode of each of the at least one attachment can be shown visually, thus, the user can be reminded of the sending mode of each of the at least one attachment.

According to a second aspect of the present disclosure, a message receiving method is provided. The message receiving method is executed in a message receiving device and includes: receiving a short message from a message sending device, where the short message includes at least one attachment; determining whether any of the at least one attachment includes a burn after reading tag; and deleting one or more of the at least one attachment which includes the burn after reading tag, after the short message is opened and when an exit or close command is received.

The present embodiment determines whether any of the at least one attachment of a received short message includes a burn after reading tag, and deletes one or more of the at least one attachment which includes the burn after reading tag directly, when the one or more of the at least one attachment includes the burn after reading tag, and when an exit or close command is received. In prior art, all contents included in the short message are deleted when a deletion operation is executed on the short message. Compared with the prior art, the present embodiment realizes customization of contents included in the short message to allow burn after reading. Privacy contents in the short message cannot be saved. The short message is protected against being leaked out, thus, privacy of the short message is improved.

In the above embodiment, preferably, the method further includes: displaying the short message, one or more of the at least one attachment having the burn after reading tag. The short message is shown in a first display style when the short message has been received but not yet opened, and the short message is shown in a second display style after the short message is opened.

The present embodiment shows the short message using two display styles, for the short message being opened or unopened. Thus, it is shown visually whether the short message has yet to be opened.

When a plurality of short messages of burn after reading are received at the same time, it is easy to distinguish which of the plurality of short messages remain unopened according to the display styles. Namely, the short messages, one or more of the at least one attachment having the burn after reading tag has been deleted, can be distinguished according to the different showing styles. If a short message is shown in the first display style, the short message has not been opened, and can be opened to view. If a showing interface of the short message is closed after the short message is opened, the short message is shown in the second display style. When the short message is shown in the second display style, one or more of the at least one attachment having the burn after reading tag included in the short message is deleted, thus, the one or more of the at least one attachment having the burn after reading tag cannot be viewed again even the short message is re-opened.

In the above embodiments, preferably, the method further include setting the first display style and/or the second display style according to a setting command.

In the present embodiment, the first display style and the second display style can be set freely, thus flexibility of showing the short message is improved. For example, the first display style can be set as a bulging envelope display style, and the second display style can be set as an empty envelope display style. Also, the first display style can be set as an envelope display style with the burn after reading tag, and the second display style can be set as an envelope display style which is torn in two pieces. It is to be understood that the display styles are not limited by the above examples.

According to a third aspect of the present disclosure, a message sending device is provided. The message sending device includes: a division unit, which divides contents included in a short message into at least one attachment according to a predetermined division rule; a selection unit, which selects a sending mode for each of the at least one attachment according to a selection command, where the sending mode includes a burn after reading sending mode or an ordinary sending mode; a tag insertion unit, which inserts a burn after reading tag into one or more of the at least one attachment when the sending mode of the one or more of the at least one attachment is detected to be the burn after reading sending mode; and a sending unit, which sends the short message, one or more of the at least one attachment include in which having the burn after reading tag, to a message receiving device, when a sending command is received, for the message receiving device deleting the one or more of the at least one attachment according to the burn after reading tag after the short message has been opened.

In the present embodiment, the short message is divided into at least one attachment, and a sending mode of each of the at least one attachment can be selected according to a selection command, thus flexibility and interest in message sending mode can be improved. Moreover, when a sending mode of one or more of the at least one attachment in the short message is the burn after reading sending mode, a burn after reading tag is inserted into the one or more of the at least one attachment, and the short message is sent by the burn after reading sending mode. After the short message is received, and when an exit or a close command to the short message is received, one or more of the at least one attachment having the burn after reading tag in the short message is deleted directly. In prior art, all contents included in the short message are deleted when a deletion operation is executed on the short message. Compared with the prior art, the present embodiment realizes customization of burn after reading to contents included in the short message. Privacy contents in the short message cannot be saved. The short message is protected against being leaked out, thus, privacy of the short message is improved.

The burn after reading can be indicated by a marker. For example, before a sending mode for each of the at least one attachment in the short message is selected, an initial marker for each of the at least one attachment can be set as "0". A default status can be that each of the at least one attachment is sent in an ordinary sending mode. After the burn after reading sending mode is selected for one or more of the at least one attachment, the marker of the one or more of the at least one attachment is changed to "1." The one or more of the at least one attachment with the marker "1" will be deleted directly after short message has been opened. One skilled in the art knows that the marker for burn after reading can be any other form, the embodiments mentioned above are not to be taken as limiting.

In the above embodiment, preferably, specifically, the division unit: identifies types of the contents included in the short message, and divides the contents in the short message into at least one attachment according to the types.

In the present embodiment, by dividing the contents in the short message into the at least one attachment according to the types of the contents, it is convenient to select the one or more of the at least one attachment which needs to be sent using the burn after reading sending mode. The contents in the short message can include one or more or a combination of the following: character texts, pictures, audios, and videos. Specifically, the contents in the short message can be divided into at least one attachment according to the types of the contents. That is, each of the character texts, pictures, audios, and videos can be taken as an attachment. In another embodiment, the short message can be divided according to a predetermined character length. For example, for character texts, one character can be taken as an attachment, or more than one character can be taken as an attachment. The character length can be set by a user.

In the above embodiments, the sending unit further: sends the short message in the ordinary sending mode, when it is detected that the sending mode of each of the at least one attachment in the short message is the ordinary sending mode.

In the present embodiment, when the sending mode of each of the at least one attachment in the short message is the ordinary sending mode, it represents that the short message can be sent in the ordinary sending mode and not the burn after reading mode.

The above embodiments, preferably, further include a display unit, which displays the at least one attachment of the short message and displays the sending modes, for the user to select a sending mode for each of the at least one attachment.

The present embodiment displays the at least one attachment of the short message and the sending modes in a display interface, thus, it is convenient for the user to select a sending mode for each of the at least one attachment. Furthermore, the sending mode of each of the at least one attachment can be shown visually, thus, the user can be reminded of the sending mode of each of the at least one attachment.

According to a fourth aspect of the present disclosure, a message receiving device is provided. The message receiving device includes: a receiving unit, which receives a short message from a message sending device, where the short message includes at least one attachment; a determination unit, which determines whether any of the at least one attachment includes a burn after reading tag; and a processing unit, which deletes one or more of the at least one attachment which includes the burn after reading tag, after the short message is opened and when an exit or close command is received.

The present embodiment determines whether any of the at least one attachment of a received short message includes a burn after reading tag, and deletes one or more of the at least one attachment which includes the burn after reading tag directly, when the one or more of the at least one attachment includes the burn after reading tag, and when an exit or close command is received. In prior art, all contents included in the short message are deleted when a deletion operation is executed on the short message. Compared with the prior art, the present embodiment realizes customization of contents included in the short message to allow burn after reading. Privacy contents in the short message cannot be saved. The short message is protected against being leaked out, thus, privacy of the short message is improved.

The above embodiment, preferably, further includes: a display unit, which displays the short message, one or more of the at least one attachment having the burn after reading tag. The short message is shown in a first display style when the short message has been received but not yet opened, and the short message is shown in a second display style after the short message is opened.

The present embodiment shows the short message using two display styles, for the short message being opened or unopened. Thus, it is shown visually whether the short message has yet to be opened.

When a plurality of short messages of burn after reading are received at the same time, it is easy to distinguish which of the plurality of short messages remain unopened according to the display styles. Namely, the short messages, one or more of the at least one attachment having the burn after reading tag has been deleted, can be distinguished according to the different showing styles. If a short message is shown in the first display style, the short message has not been opened, and can be opened to view. If a showing interface of the short message is closed after the short message is opened, the short message is shown in the second display style. When the short message is shown in the second display style, one or more of the at least one attachment having the burn after reading tag included in the short message is deleted, thus, the one or more of the at least one attachment having the burn after reading tag cannot be viewed again even the short message is re-opened.

The above embodiments, preferably, further include: a setting unit, which sets the first display style and/or the second display style according to a setting command.

In the present embodiment, the first display style and the second display style can be set freely, thus flexibility of showing the short message is improved. For example, the first display style can be set as a bulging envelope display style, and the second display style can be set as an empty envelope display style. Also, the first display style can be set as an envelope display style with the burn after reading tag, and the second display style can be set as an envelope display style which is torn in two pieces. It is to be understood that the display styles are not limited by the above examples.

DETAILED DESCRIPTION

For simplicity and clarity of illustration, where appropriate, the above drawings illustrate the embodiments. Different embodiments and elements in different embodiments of the present disclosure can be combined and not combined.

The embodiments described herein are for better understanding of the present disclosure, other embodiments can also be practiced. The description is not to be considered as limiting the scope of the embodiments described herein.

Figure 1:
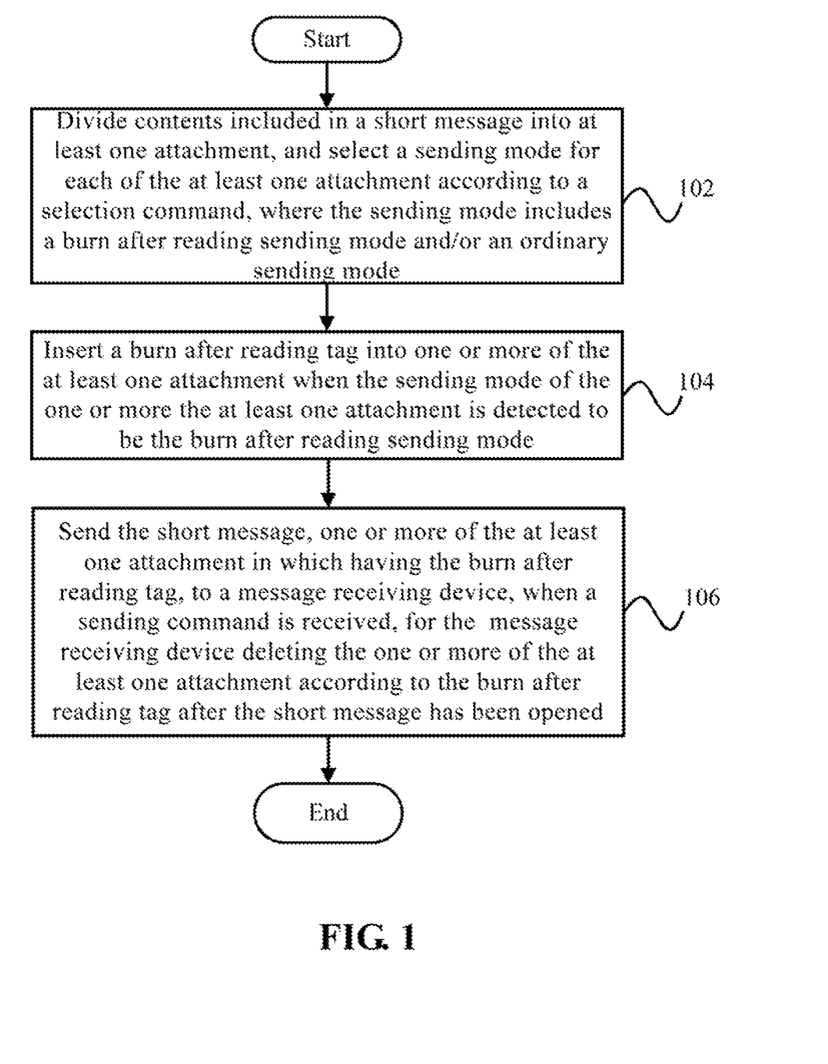
FIG. 1 shows a flowchart of one embodiment of a message sending method according to the present disclosure.

FIG. 1 shows a flowchart of one embodiment of a message sending method according to the present disclosure.

As shown in FIG. 1, the message sending method according to the present disclosure is executed in a message sending device, and includes: step 102, dividing contents included in a short message into at least one attachment according to a predetermined division rule, and selecting a sending mode for each of the at least one attachment according to a selection command, where the sending mode includes a burn after reading sending mode and an ordinary sending mode; step 104, inserting a burn after reading tag to one or more of the at least one attachment when the sending mode of the one or more of the at least one attachment is detected as the burn after reading sending mode; step 106, sending the short message, one or more of the at least one attachment include in which having the burn after reading tag, to a message receiving device, when a sending command is received, for the message receiving device deleting the one or more of the at least one attachment according to the burn after reading tag after the short message has been opened.

In the present embodiment, the short message is divided into at least one attachment, and a sending mode of each of the at least one attachment can be selected according to a selection command, thus flexibility and interest in message sending mode can be improved. Moreover, when a sending mode of one or more of the at least one attachment in the short message is the burn after reading sending mode, a burn after reading tag is inserted into the one or more of the at least one attachment, and the short message is sent by the burn after reading sending mode. After the short message is received, and when an exit or a close command to the short message is received, one or more of the at least one attachment having the burn after reading tag in the short message is deleted directly. In prior art, all contents included in the short message are deleted when a deletion operation is executed on the short message. Compared with the prior art, the present embodiment realizes customization of burn after reading to contents included in the short message. Privacy contents in the short message cannot be saved. The short message is protected against being leaked out, thus, privacy of the short message is improved.

The burn after reading can be indicated by a marker. For example, before a sending mode for each of the at least one attachment in the short message is selected, an initial marker for each of the at least one attachment can be set as "0". A default status can be that each of the at least one attachment is sent in an ordinary sending mode. After the burn after reading sending mode is selected for one or more of the at least one attachment, the marker of the one or more of the at least one attachment is changed to "1." The one or more of the at least one attachment with the marker "1" will be deleted directly after short message has been opened. One skilled in the art knows that the marker for burn after reading can be any other form, the embodiments mentioned above are not to be taken as limiting.

In the above embodiment, preferably, the predetermined division rule includes: identifying types of the contents included in the short message, and dividing the contents in the short message into at least one attachment according to the types.

In the present embodiment, by dividing the contents in the short message into the at least one attachment according to the types of the contents, it is convenient to select the one or more of the at least one attachment which needs to be sent using the burn after reading sending mode. The contents in the short message can include one or more or a combination of the following: character texts, pictures, audios, and videos. Specifically, the contents in the short message can be divided into at least one attachment according to the types of the contents. That is, each of the character texts, pictures, audios, and videos can be taken as an attachment. In another embodiment, the short message can be divided according to a predetermined character length. For example, for character texts, one character can be taken as an attachment, or more than one character can be taken as an attachment. The character length can be set by a user.

The above embodiments, preferably, further include: sending the short message in the ordinary sending mode, when it is detected that the sending mode of each of the at least one attachment in the short message is the ordinary sending mode.

In the present embodiment, when the sending mode of each of the at least one attachment in the short message is the ordinary sending mode, it represents that the short message can be sent in the ordinary sending mode and not the burn after reading mode.

The above embodiments, preferably, further include: displaying the at least one attachment of the short message and displaying the sending modes, for the user to select a sending mode for each of the at least one attachment.

The present embodiment displays the at least one attachment of the short message and the sending modes in a display interface, thus, it is convenient for the user to select a sending mode for each of the at least one attachment. Furthermore, the sending mode of each of the at least one attachment can be shown visually, thus, the user can be reminded of the sending mode of each of the at least one attachment.

Figure 2:
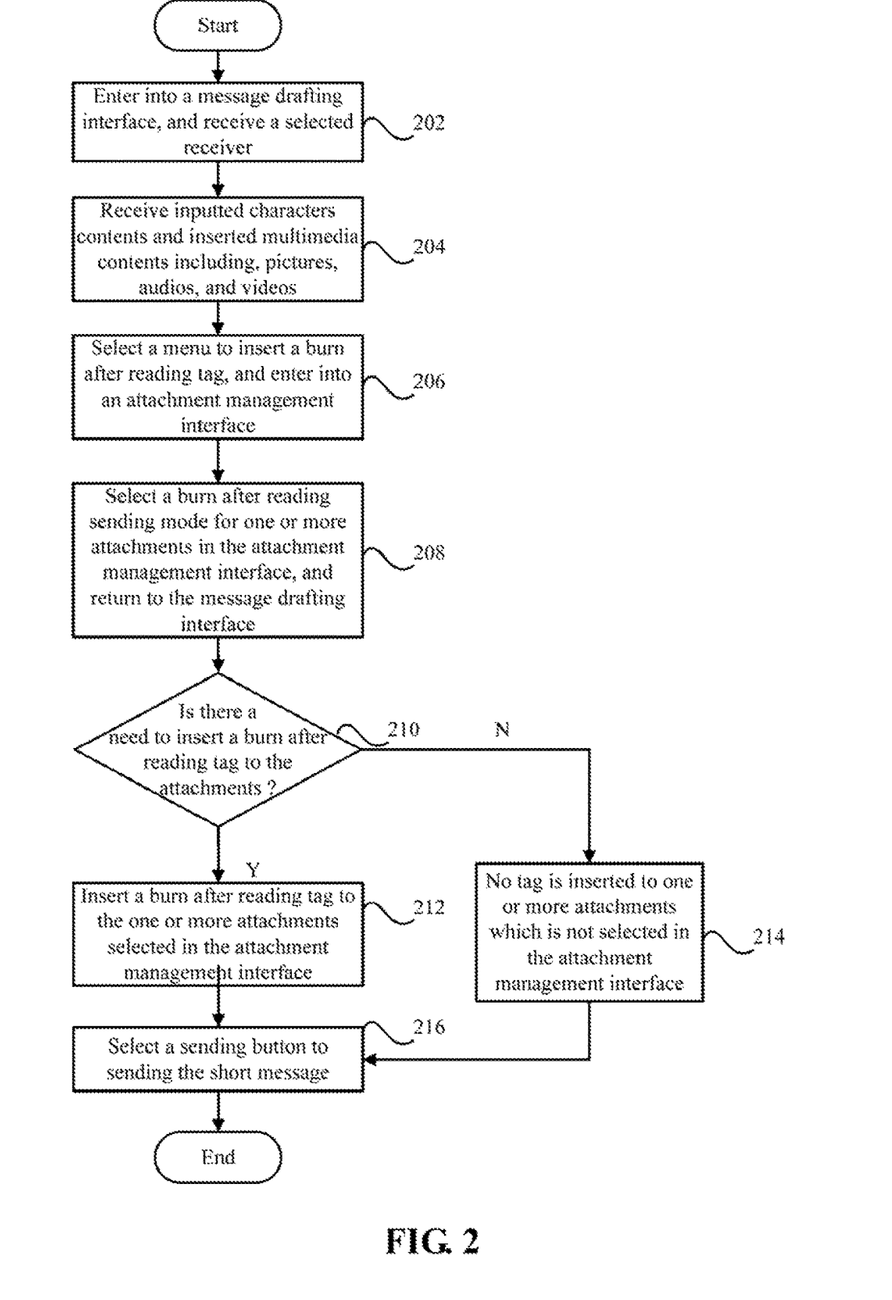
FIG. 2 shows a flowchart of another embodiment of a message sending method according to the present disclosure.

FIG. 2 shows a schematic flowchart of another embodiment of a message sending method according to the present disclosure.

Referring to FIG. 2, according to the present disclosure, another embodiment of a message sending method includes:

Step 202, a message application run, a message drafting interface of the message application is entered, and a selected receiver is received.

Step 204, a short message is drafted by receiving inputted characters texts and inserted multimedia contents including pictures, audios, and videos.

Figure 3:
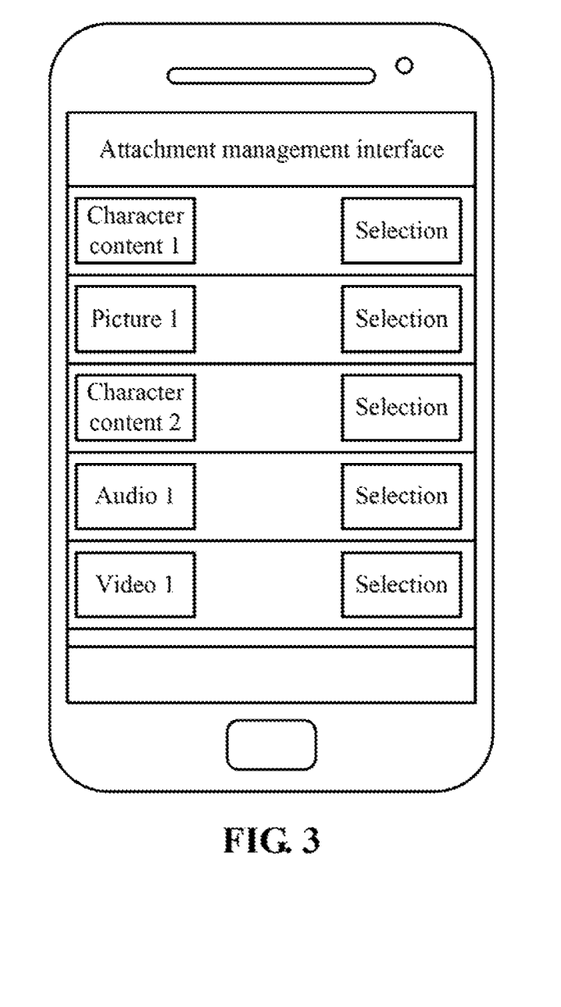
FIG. 3 shows a diagram of one embodiment of a selection interface for modes of sending attachments according to the present disclosure.

Step 206, a burn after reading tag is selected in a menu option; contents in the short message is identified automatically; the contents of the short message is divided into at least one attachment according to the contents; and an attachment management interface is entered. In the attachment management interface, all of the characters texts, pictures, audios, and videos in the short message are listed, for a user can select a burn after reading tag for each of the characters texts, pictures, audios, and videos in the short message. The attachment management interface is shown in FIG. 3. Users can select one or more attachments using the interface as shown in FIG. 3

Step 208, after selecting a burn after reading sending mode for one or more of the at least one attachment in the attachment management interface, the message drafting interface is returned.

Step 210, it is determined whether there is a need to insert a burn after reading tag to the at least one attachment in the short message. Step 212 is implemented when there is a need to insert a burn after reading tag to the at least one attachment. Step 214 is implemented when there is no need to insert a burn after reading tag to the at least one attachment.

Step 212, a burn after reading tag is inserted into the one or more of the at least one attachment in the short message which is selected in the attachment management interface, such as a character text 1 and a picture 1.

Step 214, no tag is inserted when there is no attachment selected in the attachment management interface.

Step 216, a sending button is selected to send the short message, thus, the one or more of the at least one attachment in the short message can burn after reading, such as the character text 1 and the picture 1 can burn after reading, but the other attachments cannot burn after reading.

Figure 4:
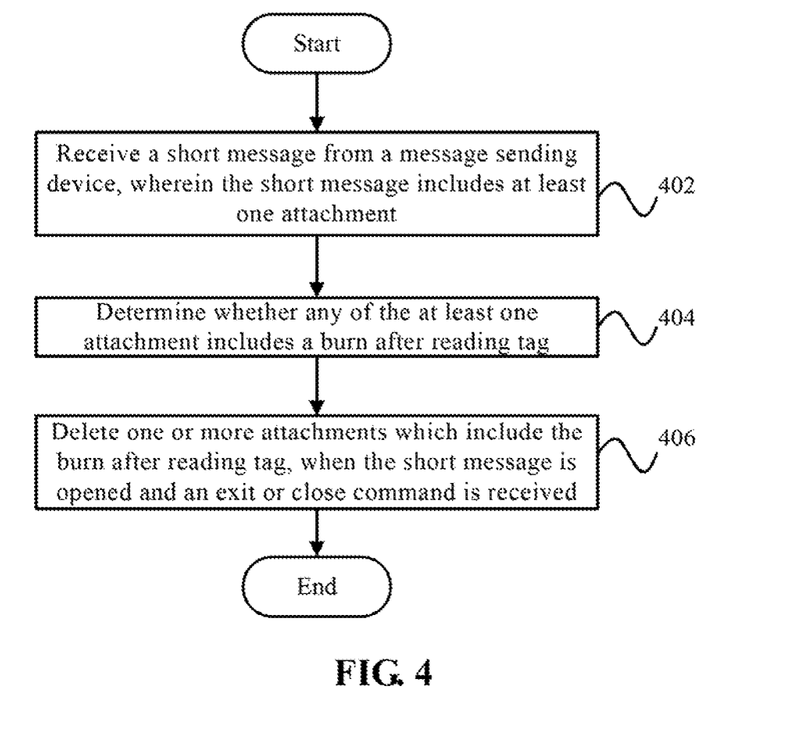
FIG. 4 shows a flowchart of one embodiment of a message receiving method according to the present disclosure.

FIG. 4 shows a schematic flowchart of one embodiment of a message receiving method according to the present disclosure.

Referring to FIG. 4, according to the present disclosure, the message receiving method is applied in a message receiving device and includes: step 402, receiving a short message from a message sending device, where the short message includes at least one attachment; step 404, determining whether any of the at least one attachment includes a burn after reading tag; and step 406, deleting one or more of the at least one attachment which includes the burn after reading tag, after the short message is opened and when an exit or close command is received.

The present embodiment determines whether any of the at least one attachment of a received short message includes a burn after reading tag, and deletes one or more of the at least one attachment which includes the burn after reading tag directly, when the one or more of the at least one attachment includes the burn after reading tag, and when an exit or close command is received. In prior art, all contents included in the short message are deleted when a deletion operation is executed on the short message. Compared with the prior art, the present embodiment realizes customization of contents included in the short message to allow burn after reading. Privacy contents in the short message cannot be saved. The short message is protected against being leaked out, thus, privacy of the short message is improved.

The above embodiment, preferably, further includes: displaying the short message, one or more of the at least one attachment having the burn after reading tag. The short message is shown in a first display style when the short message has been received but not yet opened, and the short message is shown in a second display style after the short message is opened.

The present embodiment shows the short message using two display styles, for the short message being opened or unopened. Thus, it is shown visually whether the short message has yet to be opened.

When a plurality of short messages of burn after reading are received at the same time, it is easy to distinguish which of the plurality of short messages remain unopened according to the display styles. Namely, the short messages, one or more of the at least one attachment having the burn after reading tag has been deleted, can be distinguished according to the different showing styles. If a short message is shown in the first display style, the short message has not been opened, and can be opened to view. If a showing interface of the short message is closed after the short message is opened, the short message is shown in the second display style. When the short message is shown in the second display style, one or more of the at least one attachment having the burn after reading tag included in the short message is deleted, thus, the one or more of the at least one attachment having the burn after reading tag cannot be viewed again even the short message is re-opened.

The above embodiments, preferably, further include setting the first display style and/or the second display style according to a setting command.

In the present embodiment, the first display style and the second display style can be set freely, thus flexibility of showing the short message is improved. For example, the first display style can be set as a bulging envelope display style, and the second display style can be set as an empty envelope display style. Also, the first display style can be set as an envelope display style with the burn after reading tag, and the second display style can be set as an envelope display style which is torn in two pieces. It is to be understood that the display styles are not limited by the above examples.

Figure 5:
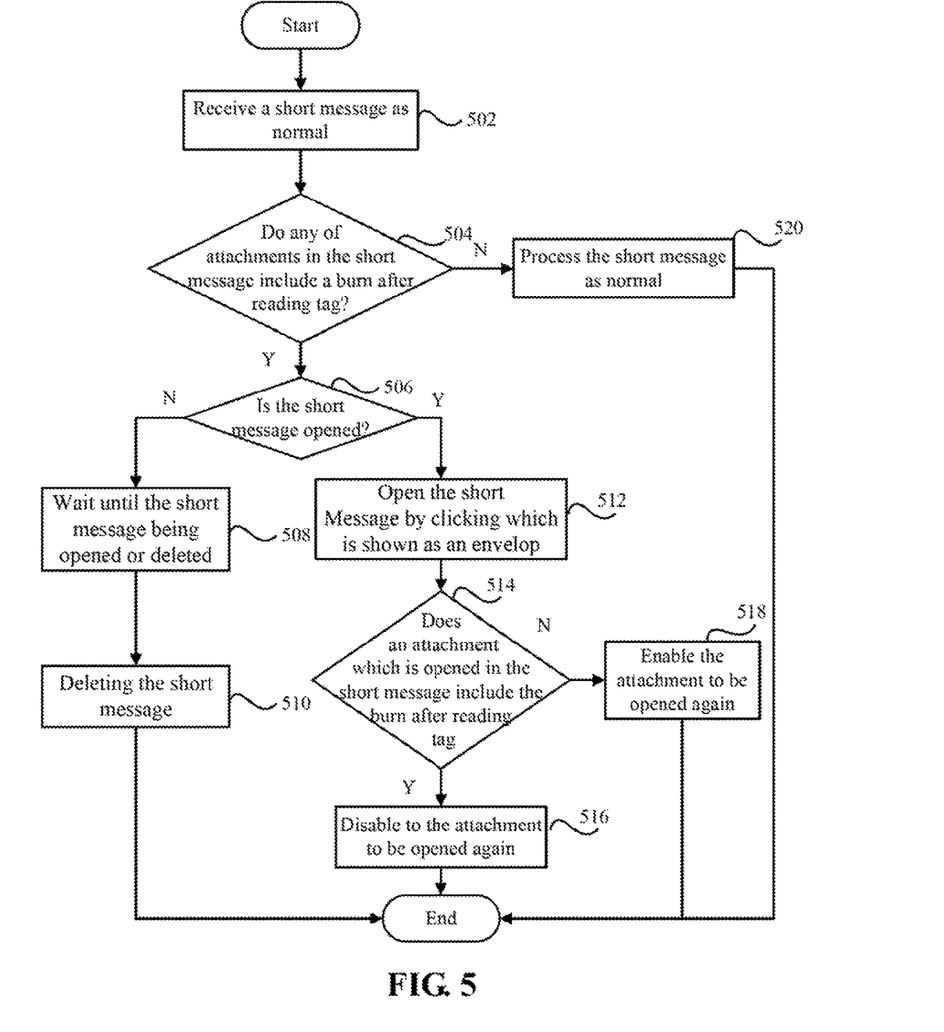
FIG. 5 shows a flowchart of another embodiment of a message receiving method according to the present disclosure.

FIG. 5 shows a schematic flowchart of another embodiment of a message receiving method according to the present disclosure.

As shown in FIG. 5, according to the present disclosure, the message receiving method includes:

Step 502, a short message is received as normal.

Step 504, it is determined that whether any of attachments in the short message including a burn after reading tag. Step 506 is implemented when any of attachments in the short message includes a burn after reading tag. Otherwise, step 520 is implemented.

Step 506, it is determined that whether the short message is opened when any of attachments in the short message includes a burn after reading tag. Step 512 is implemented when the short message is opened. Otherwise, step 508 is implemented.

Step 508, the short message is shown as unopened (the first display style), and waits until being opened, when the short message is unopened.

Step 510, the short message of burn after reading can be deleted as an ordinary short message, no matter whether the short message has been opened or unopened. After being deleted, the short message of burn after reading cannot be opened again.

Step 512, the short message is clicked to be opened when there is a need to read the short message.

Step 514, it is determined that whether an attachment which is opened currently in the short message includes a burn after reading tag after the short message is opened. Step 516 is implemented when the attachment which is opened currently in the short message includes the burn after reading tag. Otherwise, step 518 is implemented.

Step 516, the attachment is deleted directly when the short message is closed or exited, and the attachment is disabled to be opened again, when the attachment includes the burn after reading tag.

Step 518, the attachment is not deleted when the short message is closed or exited, and the attachment can be opened again, when the attachment does not include the burn after reading tag.

Step 520, the short message is received as normal when no attachment in the short message includes a burn after reading tag.

Figure 6:
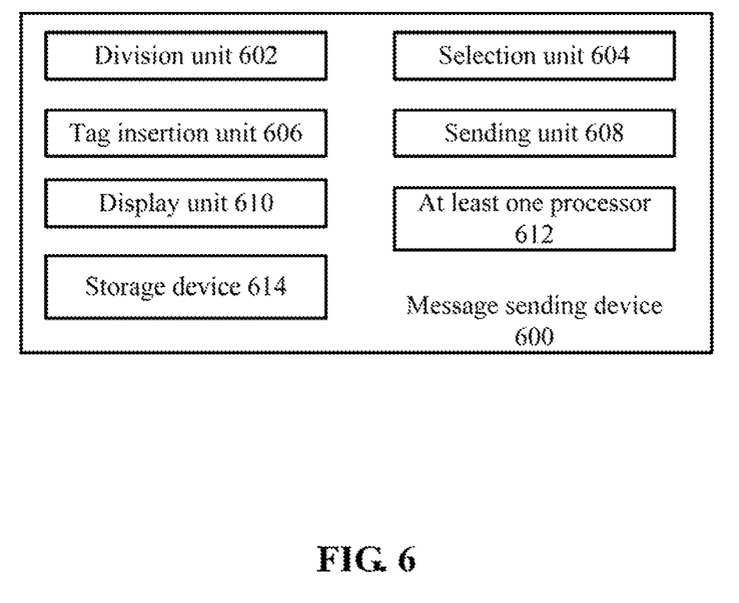
FIG. 6 shows a structure of an exemplary embodiment of a message sending device.

FIG. 6 shows a schematic structure of an exemplary embodiment of a message sending device.

FIG. 6 illustrates only one example of a message sending device 600 that may include more or fewer components than illustrated, or have a different configuration of the various components.

Referring to FIG. 6, the message sending device 600 according to the present embodiment includes: a division unit 602, which divides contents included in a short message into at least one attachment according to a predetermined division rule; a selection unit 604, which selects a sending mode for each of the at least one attachment according to a selection command, where the sending mode includes a burn after reading sending mode or an ordinary sending mode; a tag insertion unit 606, which inserts a burn after reading tag into one or more of the at least one attachment when the sending mode of the one or more of the at least one attachment is detected to be the burn after reading sending mode; and a sending unit 608, which sends the short message, one or more of the at least one attachment include in which having the burn after reading tag, to a message receiving device, when a sending command is received, for the message receiving device deleting the one or more of the at least one attachment according to the burn after reading tag after the short message has been opened.

In the present embodiment, the short message is divided into at least one attachment, and a sending mode of each of the at least one attachment can be selected according to a selection command, thus flexibility and interest in message sending mode can be improved. Moreover, when a sending mode of one or more of the at least one attachment in the short message is the burn after reading sending mode, a burn after reading tag is inserted into the one or more of the at least one attachment, and the short message is sent by the burn after reading sending mode. After the short message is received, and when an exit or a close command to the short message is received, one or more of the at least one attachment having the burn after reading tag in the short message is deleted directly. In prior art, all contents included in the short message are deleted when a deletion operation is executed on the short message. Compared with the prior art, the present embodiment realizes customization of burn after reading to contents included in the short message. Privacy contents in the short message cannot be saved. The short message is protected against being leaked out, thus, privacy of the short message is improved.

The burn after reading can be indicated by a marker. For example, before a sending mode for each of the at least one attachment in the short message is selected, an initial marker for each of the at least one attachment can be set as "0". A default status can be that each of the at least one attachment is sent in an ordinary sending mode. After the burn after reading sending mode is selected for one or more of the at least one attachment, the marker of the one or more of the at least one attachment is changed to "1." The one or more of the at least one attachment with the marker "1" will be deleted directly after short message has been opened. One skilled in the art knows that the marker for burn after reading can be any other form, the embodiments mentioned above are not to be taken as limiting.

In the above embodiment, preferably, specifically, the division unit 602: identifies types of the contents included in the short message, and dividing the contents in the short message into at least one attachment according to the types.

In the present embodiment, by dividing the contents in the short message into the at least one attachment according to the types of the contents, it is convenient to select the one or more of the at least one attachment which needs to be sent using the burn after reading sending mode. The contents in the short message can include one or more or a combination of the following: character texts, pictures, audios, and videos. Specifically, the contents in the short message can be divided into at least one attachment according to the types of the contents. That is, each of the character texts, pictures, audios, and videos can be taken as an attachment. In another embodiment, the short message can be divided according to a predetermined character length. For example, for character texts, one character can be taken as an attachment, or more than one character can be taken as an attachment. The character length can be set by a user.

In the above embodiments, preferably, the sending unit 608 further: sends the short message in the ordinary sending mode, when it is detected that the sending mode of each of the at least one attachment in the short message is the ordinary sending mode.

In the present embodiment, when the sending mode of each of the at least one attachment in the short message is the ordinary sending mode, it represents that the short message can be sent in the ordinary sending mode and not the burn after reading mode.

The above embodiments, preferably, further include: a display unit 610, which displays the at least one attachment of the short message and displays the sending modes, for the user to select a sending mode for each of the at least one attachment.

The present embodiment displays the at least one attachment of the short message and the sending modes in a display interface, thus, it is convenient for the user to select a sending mode for each of the at least one attachment. Furthermore, the sending mode of each of the at least one attachment can be shown visually, thus, the user can be reminded of the sending mode of each of the at least one attachment.

The message sending device 600 can further includes at least one processor 612 and a storage device 614. The division unit 602, the selection unit 604, the tag insertion unit 606, the sending unit 608, the display unit 610, and other units or subunits as described below, include computerized instructions in the form of one or more computer-readable programs that can be stored in the storage device 614, and can be implemented by the at least one processor 612.

The at least one processor 612 is used to execute a plurality of units or subunits in the message sending device 600 and other applications, such as an operating system, installed in the message sending device 600. The storage devices 614 store the computerized instructions of a plurality of units or subunits in the message sending device 600, and one or more programs, such as the operating system and applications of the message sending device 600. The storage device 614 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

Figure 7:
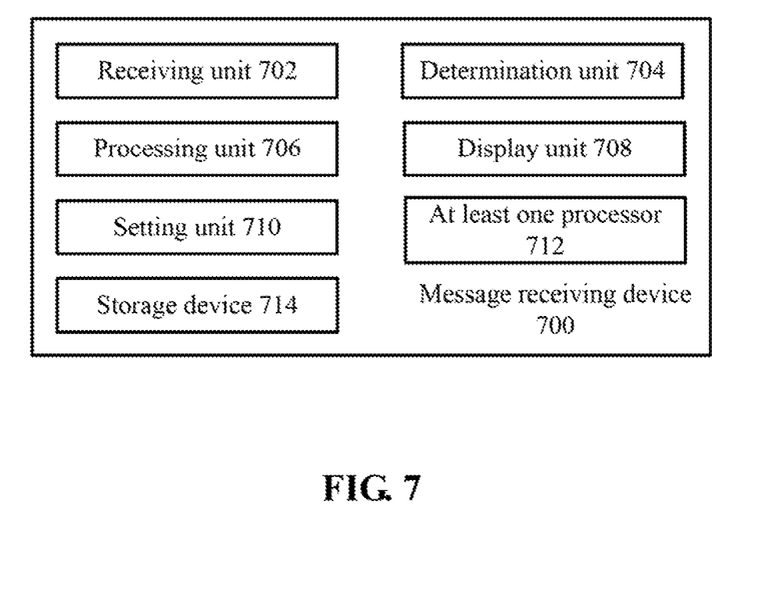
FIG. 7 shows a structure of an exemplary embodiment of a message receiving device.

FIG. 7 shows a schematic structure of an exemplary embodiment of a message receiving device.

FIG. 7 illustrates only one example of a message receiving device 700 that may include more or fewer components than illustrated, or have a different configuration of the various components.

Referring to FIG. 7, the message receiving device 700 according to the present embodiment, includes: a receiving unit 702, which receives a short message from the message sending device 600, where the short message includes at least one attachment; a determination unit 704, which determines whether any of the at least one attachment includes a burn after reading tag; and a processing unit 706, which deletes one or more of the at least one attachment which includes the burn after reading tag, after the short message is opened and when an exit or close command is received.

The present embodiment determines whether any of the at least one attachment of a received short message includes a burn after reading tag, and deletes one or more of the at least one attachment which includes the burn after reading tag directly, when the one or more of the at least one attachment includes the burn after reading tag, and when an exit or close command is received. In prior art, all contents included in the short message are deleted when a deletion operation is executed on the short message. Compared with the prior art, the present embodiment realizes customization of contents included in the short message to allow burn after reading. Privacy contents in the short message cannot be saved. The short message is protected against being leaked out, thus, privacy of the short message is improved.

The above embodiment, preferably, further includes: a display unit 708, which displays the short message, one or more of the at least one attachment having the burn after reading tag. The short message is shown in a first display style when the short message has been received but not yet opened, and the short message is shown in a second display style after the short message is opened.

The present embodiment shows the short message using two display styles, for the short message being opened or unopened. Thus, it is shown visually whether the short message has yet to be opened.

When a plurality of short messages of burn after reading are received at the same time, it is easy to distinguish which of the plurality of short messages remain unopened according to the display styles. Namely, the short messages, one or more of the at least one attachment having the burn after reading tag has been deleted, can be distinguished according to the different showing styles. If a short message is shown in the first display style, the short message has not been opened, and can be opened to view. If a showing interface of the short message is closed after the short message is opened, the short message is shown in the second display style. When the short message is shown in the second display style, one or more of the at least one attachment having the burn after reading tag included in the short message is deleted, thus, the one or more of the at least one attachment having the burn after reading tag cannot be viewed again even the short message is re-opened.

The above embodiments, preferably, further include: a setting unit 710, which sets the first display style and/or the second display style according to a setting command.

In the present embodiment, the first display style and the second display style can be set freely, thus flexibility of showing the short message is improved. For example, the first display style can be set as a bulging envelope display style, and the second display style can be set as an empty envelope display style. Also, the first display style can be set as an envelope display style with the burn after reading tag, and the second display style can be set as an envelope display style which is torn in two pieces. It is to be understood that the display styles are not limited by the above examples.

The message receiving device 700 can further includes at least one processor 712 and a storage device 714. The receiving unit 702, the determination unit 704, the processing unit 706, the display unit 708, the setting unit 710, and other units or subunits as described below, include computerized instructions in the form of one or more computer-readable programs that can be stored in the storage device 714, and can be implemented by the at least one processor 712.

The at least one processor 712 is used to execute a plurality of units or subunits in the message receiving device 700 and other applications, such as an operating system, installed in the message receiving device 7000. The storage devices 714 store the computerized instructions of a plurality of units or subunits in the message receiving device 700, and one or more programs, such as the operating system and applications of the message receiving device 700. The storage device 714 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

The message sending device 600 and the message receiving device 700 may be a mobile phone, a tablet computer, a personal digital assistant, a notebook computer, or other computing device.

The word "unit" as used hereinafter, refers to logic embodied in hardware or firmware, or to a collection of software instructions, written in a programming language, such as, for example, Java, C, or assembly. One or more software instructions in the function units may be embedded in firmware (e.g., the message sending device 600 and the message receiving device 700). It will be appreciated that the function units may include connected logic units, such as gates and flip-flops, and may include programmable units, such as programmable gate arrays or processors. The function units described herein may be implemented as either software and/or hardware units and may be stored in a storage device. The storage device can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. The function units, when controlled by a processor, can execute the functions as mentioned above or as follows.

The present disclosure has been explicated above by referring to the drawings. Using the present disclosure, a sending mode of each of at least one attachment in a short message can be selected flexibility. Upon the condition that, the short message is sent using a burn after reading sending mode, one or more of the at least one attachment in the short message of burn after reading is deleted directly, when a close or an exit command to the short message is received. Thus, privacy of the short message is improved.

According to the present disclosure, a program product stored in a non-transitory computer readable medium is provided. The program product is used to send message in a terminal, and includes instructions executable by a computer system to perform the following steps: dividing contents included in a short message into at least one attachment according to a predetermined division rule, and selecting a sending mode for each of the at least one attachment according to a selection command, where the sending mode includes a burn after reading sending mode or an ordinary sending mode; inserting a burn after reading tag into one or more of the at least one attachment when the sending mode of the one or more of the at least one attachment is detected to be the burn after reading sending mode; sending the short message, one or more of the at least one attachment include in which having the burn after reading tag, to a message receiving device, when a sending command is received, for the message receiving device deleting the one or more of the at least one attachment according to the burn after reading tag after the short message has been opened.

According to the present disclosure, a non-transitory computer readable medium is also provided. The non-transitory computer readable medium stores a program product which is used to send message in a terminal and includes instructions executable by a computer system to perform the following steps: dividing contents included in a short message into at least one attachment according to a predetermined division rule, and selecting a sending mode for each of the at least one attachment according to a selection command, where the sending mode includes a burn after reading sending mode or an ordinary sending mode; inserting a burn after reading tag into one or more of the at least one attachment when the sending mode of the one or more of the at least one attachment is detected to be the burn after reading sending mode; sending the short message, one or more of the at least one attachment include in which having the burn after reading tag, to a message receiving device, when a sending command is received, for the message receiving device deleting the one or more of the at least one attachment according to the burn after reading tag after the short message has been opened.

According to the present disclosure, a program readable by a machine is also provided. When executed by the machine, the program can cause the machine to perform a message sending method of any of the above mentioned embodiments.

According to the present disclosure, a storage medium which stores a program readable by a machine is also provided. When executing the program, the machine can perform a message sending method of any of the above mentioned embodiments.

According to the present disclosure, a program product stored in a non-transitory computer readable medium is provided. The program product is used to receive messages in a terminal, and includes instructions executable by a computer system to perform the following steps: receiving a short message from a message sending device, where the short message includes at least one attachment; determining whether any of the at least one attachment includes a burn after reading tag; and deleting one or more of the at least one attachment which includes the burn after reading tag, after the short message is opened and when an exit or close command is received.

According to the present disclosure, a non-transitory computer readable medium is also provided. The non-transitory computer readable medium stores a program product which is used to send message in a terminal and includes instructions executable by a computer system to perform the following steps: receiving a short message from a message sending device, where the short message includes at least one attachment; determining whether any of the at least one attachment includes a burn after reading tag; and deleting one or more of the at least one attachment which includes the burn after reading tag, after the short message is opened and when an exit or close command is received.

According to the present disclosure, a program readable by a machine is also provided. When executed by the machine, the program can cause the machine to perform a message receiving method of any of the above mentioned embodiments.

According to the present disclosure, a storage medium which stores a program readable by a machine is also provided. When executing the program, the machine can perform a message receiving method of any of the above mentioned embodiments.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented message sending method, for being executed in a message sending device, the method comprising:
    dividing contents comprised in a short message into at least one attachment according to a predetermined division rule, and selecting a sending mode for each of the at least one attachment according to a selection command, the sending mode comprising a burn after reading sending mode and an ordinary sending mode;
    inserting a burn after reading tag into one or more of the at least one attachment when the sending mode of the one or more of the at least one attachment is detected to be the burn after reading sending mode; and
    sending the short message, one or more of the at least one attachment comprised in which having the burn after reading tag, to a message receiving device, when a sending command is received, for the message receiving device deleting the one or more of the at least one attachment according to the burn after reading tag after the short message has been opened.

2. The method of claim 1, wherein the predetermined division rule comprises: indentifying types of the contents comprised in the short message, and dividing the contents in the short message into at least one attachment according to the types.

3. The method of claim 1, further comprising:
    sending the short message in the ordinary sending mode, when it is detected that the sending mode of each of the at least one attachment in the short message is the ordinary sending mode.

4. The method of claim 1, further comprising:
    displaying the at least one attachment of the short message and displaying the sending modes, for a user to select a sending mode for each of the at least one attachment.

5. A computer-implemented message receiving method, for being executed in a message receiving device, the method comprising:
    receiving a short message from a message sending device, contents comprised in the short message being divided into at least one attachment according to a predetermined division rule, a sending mode being selected for each of the at least one attachment, a burn after reading tag being inserted into one or more of the at least one attachment when the sending mode of the one or more of the at least one attachment being a burn after reading sending mode; and deleting one or more of the at least one attachment that comprises the burn after reading tag, after the short message is opened and when an exit or close command is received.

6. The method of claim 5, further comprising:
displaying the short message, one or more of the at least one attachment having the burn after reading tag, the short message being shown in a first display style when the short message has been received but not yet opened, or shown in a second display style after the short message is opened.

7. The method of claim 6, further comprising:
setting the first display style and the second display style according to a setting command.

8. A message sending device, comprising:
at least one processor; and
a storage device storing a plurality of instructions, which when executed by the processor, causes the at least one processor to:
divide contents comprised in a short message into at least one attachment according to a predetermined division rule;
select a sending mode for each of the at least one attachment according to a selection command, wherein the sending mode comprises a burn after reading sending mode or an ordinary sending mode;
insert a burn after reading tag to one or more of the at least one attachment when the sending mode of the one or more of the at least one attachment is detected as the burn after reading sending mode; and
send the short message, one or more of the at least one attachment include in which having the burn after reading tag, to a message receiving device, when a sending command is received, for the message receiving device deleting the one or more of the at least one attachment according to the burn after reading tag after the short message has been opened.

9. The device of claim 8, wherein the at least one processor further:
indentifies types of the contents comprised in the short message, and divides the contents in the short message into at least one attachment according to the types.

10. The device of claim 8, wherein the at least one processor further:
sends the short message in the ordinary sending mode, when it is detected that the sending mode of each of the at least one attachment in the short message is the ordinary sending mode.

11. The device of claim 8, wherein the at least one processor further:
displays the at least one attachment of the short message and displays the sending modes, for a user to select a sending mode for each of the at least one attachment.

12. A message receiving device, comprising:
at least one processor; and
a storage device storing a plurality of instructions, which when executed by the processor, causes the at least one processor to:
receive a short message from a message sending device, contents comprised in the short message being divided into at least one attachment according to a predetermined division rule, a sending mode being selected for each of the at least one attachment, a burn after reading tag being inserted into one or more of the at least one attachment when the sending mode of the one or more of the at least one attachment being a burn after reading sending mode; and
delete one or more of the at least one attachment that comprises the burn after reading tag, when the short message is opened and an exit or close command is received.

13. The device of claim 12, wherein the at least one processor further:
displays the short message, one or more of the at least one attachment having the burn after reading tag, the short message being shown in a first display style when the short message has been received but not yet opened, or shown in a second display style after the short message is opened.

14. The device of claim 13, wherein the at least one processor further:
sets the first display style and the second display style according to a setting command.

15. The method of claim 5, wherein the predetermined division rule comprises: identifying types of the contents comprised in the short message, and dividing the contents in the short message into at least one attachment according to the types.

16. The device of claim 12, wherein the predetermined division rule comprises: identifying types of the contents comprised in the short message, and dividing the contents in the short message into at least one attachment according to the types.

* * * * *